United States Patent [19]

Niznik et al.

[11] Patent Number: 5,614,589
[45] Date of Patent: Mar. 25, 1997

[54] TRANSPARENT, ANTISTATIC THERMOPLASTIC COMPOSITION AND METHODS OF MAKING THE SAME

[75] Inventors: George E. Niznik, Exton; Arie Hochberg, Rosemont, both of Pa.

[73] Assignee: Kawasaki Chemical Holding Co., Inc., Wilmington, Del.

[21] Appl. No.: 152,761

[22] Filed: Nov. 15, 1993

[51] Int. Cl.$^6$ .................................................. C08F 8/30
[52] U.S. Cl. .................... 525/71; 525/77; 525/80; 525/83; 525/125; 525/127; 525/130
[58] Field of Search .................. 525/66, 127, 130, 525/71, 77, 80, 83, 125

[56] References Cited

U.S. PATENT DOCUMENTS

| | | | |
|---|---|---|---|
| 3,049,505 | 8/1962 | Grabowski | 260/45.4 |
| 4,179,479 | 12/1979 | Carter, Jr. | 525/66 |
| 4,251,642 | 2/1981 | Tan et al. | 525/66 |
| 4,764,563 | 8/1988 | Meredith et al. | 525/316 |
| 4,980,417 | 12/1990 | Biglione et al. | 525/125 |
| 5,010,139 | 4/1991 | Yu | 525/187 |
| 5,047,495 | 9/1991 | Kolycheck | 528/76 |
| 5,159,053 | 10/1992 | Kolycheck et al. | 528/76 |
| 5,216,062 | 6/1993 | Lausberg et al. | 524/404 |

FOREIGN PATENT DOCUMENTS

WO9205220   4/1992   WIPO.

*Primary Examiner*—Paul J. Thibodeau
*Assistant Examiner*—Mary Critharis
*Attorney, Agent, or Firm*—Panitch Schwarze Jacobs & Nadel, P.C.

[57] ABSTRACT

Transparent methacrylate-acrylonitrile-butadiene-styrene (MABS) thermoplastic copolymers may be provided with electrostatic dissipative (ESD) properties, while maintaining or enhancing physical properties of the MABS, such as impact strength, by blending the MABS with an inherently antistatic thermoplastic urethane copolymer which is the reaction product of a hydroxy-terminated polyalkylene ether oligimer, a $C_2$–$C_6$ alkanediol and an aromatic diisocyanate, and compatibilizing the blend of MABS and urethane with an acrylonitrile-butadiene-styrene rubbery copolymer produced by emulsion polymerization containing at least 40 weight percent butadiene monomer and a ratio of styrene to acrylonitrile which will produce a rubbery copolymer having a refractive index in the range of about 1.53 to 1.55. All three copolymer components of the transparent blend have refractive indices in the range of about 1.53 to 1.55.

8 Claims, No Drawings

TRANSPARENT, ANTISTATIC THERMOPLASTIC COMPOSITION AND METHODS OF MAKING THE SAME

FIELD OF THE INVENTION

The present invention relates to modified methacrylate acrylonitrile-butadiene-styrene compositions which are transparent, electrodissipative and have enhanced physical properties.

BACKGROUND OF THE INVENTION

In many applications, it is desirable to have a plastic composition which is transparent, has antistatic or electrostatic dissipative (ESD) properties and enhanced physical properties, such as impact strength. Transparency is a particularly desirable property for packaging materials and containers to permit visual inspection of the packaged contents. However, typical prior art transparent plastic materials having low conductivity often accumulate static electrical charges during formation and use. The presence of a static electrical charge may cause dust to adhere to articles packaged with such plastic material or it may cause the plastic material to adhere to itself or other articles.

Electrodissipative materials prevent the buildup of such static charges. The accumulation of static electrical charges upon plastic material may be prevented by incorporating within or coating the surface of the plastic material with an antistatic agent. For example, electronic components are often shipped in transparent, extruded plastic tubes which are treated with antistatic agents to inhibit the formation of static electrical charges which may damage the components. The transparent tubes permit visual inspection of the tube content for product identification.

In order to achieve antistatic behavior by blending an inherently anti-static polymer with another resin it is important that the two resins are dispersed uniformly. However, it is equally important that there be two distinct polymer phases so that the inherently antistatic polymer will dissipate the charge at the surface of the molded article.

In order to achieve transparency one skilled in the art would be led to select immiscible polymers, one of which is antistatic in nature, which are reasonably compatible to achieve a uniform dispersion and finally which are identical in refractive index to achieve transparency.

Unfortunately, many prior art inherently antistatic polymers have refractive indices sufficiently different from the refractive index of the described base polymer so as to adversely affect transparency. In almost all such prior uses the refractive indices will be only those providing some degree of translucency, at best. It is at this point that, in order to achieve transparency, a more unique blend is needed.

Alternate approaches have been tried, as mentioned above, using soluble additives or coatings. However, the antistatic property of materials including nonpolymeric additives or coatings may deteriorate or become inconsistent if the coating or any additive which blooms to the surface of the material is rubbed away. Also, many antistatic additives are damaged or destroyed by high processing temperatures typically encountered in thermoplastic processing.

It would be desirable to have a transparent, electrodissipative thermoplastic material with high impact strength in which the electrodissipative property is consistent throughout the material and does not appreciably diminish over time.

SUMMARY OF THE INVENTION

The present invention overcomes the drawbacks of prior art thermoplastic compositions by providing a transparent thermoplastic composition having electrodissipative properties and enhanced properties, such as percent light transmission, impact strength and elongation, among other desirable benefits. The transparent thermoplastic composition comprises a blend of: (1) a transparent methacrylate acrylonitrile-butadiene-styrene (MABS) thermoplastic copolymer; (2) a transparent, antistatic thermoplastic urethane copolymer which is the reaction product of a hydroxy-terminated alkylene ether oligimer, a $C_2$–$C_6$ alkanediol and an aromatic diisocyanate; and (3) an acrylonitrile-butadiene-styrene (ABS) rubbery copolymer. Each of the copolymers of the composition preferably has a refractive index of about 1.53 to 1.55.

Another aspect of the present invention is a method for improving the transparency, impact strength and electrostatic dissipation of a MABS copolymer. The method comprises mixing the MABS copolymer with the above polyurethane component and an ABS rubbery copolymer to form a compatible blend.

DETAILED DESCRIPTION OF THE PREFERRED EMBODIMENTS

The transparent, thermoplastic compositions of the present invention are not only electrodissipative but also have excellent clarity and improved physical properties such as elongation and impact strength. Thus, the ABS rubber component serves as a compatibilizer for the MABS and urethane copolymer components to thereby improve the optical and mechanical properties and an impact modifier to improve the impact properties of the blend. It will be understood by those skilled in the art that in order to maintain suitable transparency, the components must have refractive indices that are not too dissimilar. It was found that transparent thermoplastic MABS copolymer has a refractive index in the range of 1.53 to 1.55 depending on the compositional variables, i.e., the ratios of methylmethacylate, acrylonitrile, butadiene, and styrene, each of which exhibits in their homopolymer form a distinct and divergent refractive index.

One example of a suitable transparent MABS copolymer is commercially available from GE Plastics, Pittsfield, Massachusetts. The material, Cycolac® GTM 5300 has a refractive index of 1.537, a specific gravity of 1.07 according to ASTM Method D792 and other physical properties as noted in Sample No. 1 in Table I. This polymer is typical of MABS rigid thermoplastic materials in that even though the material is transparent, the morphology of the material is such that there are two phases, a continuous phase of rigid copolymer and a minor portion of finely dispersed butadiene containing rubber phase. A transmission electron micrograph of this material revealed that the particle size of the rubber phase is 0.07 microns on the average and that the particle size distribution is quite narrow. The small particle size reduces the refractive tendencies of light passing through the continuous phase so that transparency is enhanced.

Another approach would be to exactly match the refractive index of the dispersed phase with that of the continuous phase. This is extremely difficult to accomplish. A third approach would be a combination of reasonably small particles having a closely matched refractive index. One of ordinary skill in the art would understand that by utilizing these various approaches, more than one MABS copolymer composition may be used in the present invention, as desired, provided that it is inherently transparent with a light transmission of at least 40% as measured on a ⅛" thick sample. The blend of this invention will comprise about 40 to about 90 weight percent of a MABS copolymer.

It was also found that a class of urethane copolymers exists which are not only transparent but also inherently etectrodissipative. Careful examination of the examples given in U.S. Pat. No. 5,159,053 shows that a range of compositions can be found which have useful mechanical properties and three fall within the range of approximately 1.53 to about 1.55. These compositions are given in Table A.

TABLE A

URETHANE COPOLYMERS

| | Refractive Index | <----------Molar Ratios----------> | | |
|---|---|---|---|---|
| | | PEG[1] | BD[2] | MDI[3] |
| 1) | 1.518 | .53 | .47 | 1 |
| 2) | 1.529 | .40 | .60 | 1 |
| 3) | 1.541 | .30 | .70 | 1 |
| 4) | 1.551 | .20 | .80 | 1 |

[1]Polyethylene Glycol, molecular weight of 1450
[2]Butanediol
[3]Methylenebisophenyldiisocyanate These urethane copolymers have polyalkylene ether oligomer segments copolymerized into the polymer to give the urethane the desirable electrodissipative properties. The more polyalkylene ether oligomer that is added, the lower the refractive index. The polyalkylene ether is also elastomeric and as a segment or block gives the urethane a somewhat elastomeric characteristic. Tensile elongations achieved are greater than 200%. The alkanediol and aromatic diisocyanate form a hard block. The greater the amount of hard block, the higher the refractive index. To one of ordinary skill in the art, finding a suitable urethane composition which is transparent, electrodissipative, and has a refractive index in the desired range of about 1.53–1.55 is achievable. However, compositions which have refractive indices close to that of the selected commercially available MABS are high in polyalkylene ether oligomer. The urethane copolymer is very soft and the pellets cold flow into a fused mass and cannot be handled easily. Moreover, the hydrophilicity of the urethane is greatly increased and drying of the pellets for use in compounding is extremely difficult. Therefore, the most suitable compositions will happen to have a refractive index in the range of 1.54 or higher.

The compositions of this invention will comprise about 10–40 weight percent of the urethane copolymer, and, preferably, about 15 to about 30 weight percent. The amount chosen generally will be that necessary to achieve the desired electrodissipative values of the blended product.

The ABS rubbery copolymer component of the blend can be selected from a variety of ABS modifiers suitable for impact modifying polyvinylchloride (PVC) in such a fashion that the transparency of the PVC is not seriously affected. GE Specialty Chemicals, Parkersburg, West Virginia, sells several of these types of ABS under the trademark BLENDEX® and Kaneka Texas Corporation, Houston, Tex. sells several under the trademark KANE ACE®.

The refractive index of the ABS copolymers useful for this invention will also be in the range of about 1.53 to 1.55. The method of preparation is emulsion polymerization. One approach to making an effective transparent ABS modifier is to keep the emulsion particle size below 0.1 microns, preferably between 0.06 and 0.09 microns. One of the examples selected as a preferred embodiment is a two stage emulsion polymer in which the first stage is a polybutadiene latex onto which is copolymerized styrene and acrylonitrile where the polybutadiene constitutes about 40 to 50 weight percent, and preferably about 45 weight percent of the polymer and the styrene-acrylonitrile ratio is adjusted to achieve an overall refractive index of 1.545. In this case, the styreneacrylonitrile ratio is 2.67/1, but it could range from about 2.5/1 to 3/1. This material is referred to in the examples as ABS-B and has a particle size as measured by transmission electron micrographs (TEM) of 0.07 microns with a narrow particle size distribution.

Another approach to making an effective transparent ABS is to synthesize a styrene-butadiene (SBR) rubber latex first stage with a refractive index close to that of the second stage which is a styrene acrylonitrile copolymer preferably grafted somewhat to the SBR first stage. U.S. Pat. No. 4,764,563 discusses a series of these ABS rubbery copolymers useful for impact modifying clear PVC.

The SBR first stage copolymer is prepared by conventional emulsion polymerization by reacting styrene and butadiene and optionally up to about 10 weight percent acrylonitrile to adjust the refractive index. Generally it is desirable to have a large amount of butadiene to achieve low temperature impact. However, too much butadiene lowers the refractive index below the desired value, thus the need for styrene and optionally acrylonitrile monomer. The typical first stage copolymer will have from about 70 to 90 weight percent butadiene. The first stage may further include up to about 2 weight percent of crosslinking monomers such as divinylbenzene. Crosslinking helps maintain the integrity of the rubbery particle so that coalesced particles (which cause haze) are not formed after compounding. The crosslinking monomer also assists in providing additional graft sites for the second stage reaction. Since the polymerization of the first stage involves butadiene, chain transfer agents such as tertiary docecyl mercaptan are employed along with the standard initiators such as potassium persulfate and buffers such as sodium hydrogen phosphate.

The typical second stage reaction occurs by further addition of styrene and acrylonitrile monomers into the emulsion medium where the monomers migrate to the emulsified SBR particles and co-react. A large degree of grafting occurs during the second stage reaction. The weight ratio of the styrene to acrylonitrile monomer added during the second stage is preferably in the range of about 3.5/1 to 4.5/1 so that the overall refractive index lies between about 1.53 and 1.55 so that transparency after blending will be maintained. Often the ratio of styrene to acrylonitrile added to the second stage has to be determined empirically, since the acrylonitrile has a 6 weight percent solubility in water, and theoretical stoichiometry is difficult to achieve in the second step reaction. Therefore, several ratios will be tested until the refractive index of the final ABS copolymer reaches the desired value.

By way of example, an ABS rubbery copolymer made by the above procedure and designated ABS-SBR was selected to demonstrate the embodiments of this invention. The composition of the ABS-SBR consists essentially of an SBR first stage rubber containing about 1 weight percent divinylbenzene onto which a second stage has been copolymerized from styrene and acrylonitrile such that the styrene to acrylonitrile ratio is approximately 4/1. The first stage is present in approximately 60 to 70 weight percent, and preferably about 65 weight percent and the second stage is present in about 35 weight percent. The refractive index measured on the isolated material was determined to be 1.539. TEM identified the particle size to be approximately 0.7–0.8 microns. The procedure to synthesize this material is given in U.S. Pat. No. 4,764,563, Examples 1–9.

It will be obvious to one skilled in the art that the two above-described ABS rubbery copolymers, ABS-B and ABS-SBR, are quite divergent in nature. The former has a polybutadiene first stage present in only 45 weight percent while the later has a styrene butadiene copolymer first stage present in 65 weight percent. The styrene to acrylonitrile ratio of the second stage also spans from 2.5/1 to 4.5/1. Even the refractive index differs to some extent: 1.545 vs 1.539. The only obvious similarities between the two ABS rubbery copolymers is that they have a butadiene containing rubbery first stage present in at least about 40 weight percent, that the second stage is an SAN copolymer, and that they both are effective in maintaining transparency when blended with PVC.

One might think that any rubbery copolymer useful in transparent PVC articles should also be effective in the compositions of this invention. However, as shown in the Examples below, this is not the case. There is an attribute of ABS rubbery copolymers which, unexpectedly, provides not only compatibility between MABS and urethane copolymers but also improves the clarity. When preparing the blended compositions of MABS and urethane copolymer, the ABS rubbery copolymer may comprise about 1 to 25 weight percent of the blend, more preferably about 5 to 20 weight percent of the blend.

The MABS copolymer, the urethane copolymer and ABS rubbery copolymer may be blended by dry tumbling and mixing in a twin screw extruder, such as a Haake twin screw extruder which is commercially available from Haake/Fisons Instruments of Paramus, N.J., for example. During the blending or compounding step, as well as subsequent processing steps, such as injection molding, the components need to be dispersed evenly without excess shear and at a temperature low enough to prevent discoloration or yellowing of the composition. Discoloration, and possible reduction in impact properties, may be attributed to degradation of the butadiene rubber in the ABS rubbery component. Other methods for blending the MABS copolymer, urethane copolymer component and ABS rubbery copolymer will be evident to those of ordinary skill in the art.

The modified MABS compositions of the present invention may be used in varied applications for which plastic materials are typically used, and are especially advantageous where antistatic, transparent properties are desired, such as packaging of electronic articles and containers for toner for photocopiers.

The present invention will now be illustrated by the following specific, non-limiting examples.

URETHANE COPOLYMER PREPARATION EXAMPLE

One example of a suitable urethane copolymer can be prepared from approximately 0.2 to 0.3 moles of polyethyleneglycol of a molecular weight around 1450, 0.7 to 0.8 moles of butanediol, and 1 mole of methylenebisphenyldiisocyanate (MDI). The ingredients are mixed in a reactor at an elevated temperature of 200°–250° C. until molecular weight reaches approximately 100,000 to 180,000. The stoichiometry is maintained such that the combined molar amounts of the hydroxyl ingredients equal the molar amount of the MDI. The composition of the urethane copolymer used to illustrate this invention in the specific example given below, as determined by nuclear magnetic resonance spectroscopy, was found to be a polyurethane block copolymer containing a relative ratio on a molar basis of the butanediol containing hard block to polyethylene oxide containing soft block of 1.4±10%. The resonance frequencies of the hydrogens after decoupling were found as follows relative to the tetramethylsilane: the butanediol interior methylenes, 1.75 ppm; exterior butanediol methylenes, 4.15 ppm. The methylenebisphenyldiisocyonate reacted with the diols to form the di-urethane linkage which was observed in the NMR spectrum as follows: methylene hydrogens, 3.75 ppm; phenylene hydrogens adjacent to the methylene, 7.05 ppm; phenylene hydrogens adjacent to the urethane linkage, 7.40 ppm. The polyethylene oxide oligomer methylene hydrogens were observed at 3.7 ppm except for the terminal methylenes which appeared at 4.20 ppm. Integration of the peak areas resulted in a calculated molecular weight for the oligomer of 1300±10%. The refractive index is 1.543, and the melt flow index was measured to be 17±2 (190° C., 8700g).

EXAMPLE I

MABS copolymer compositions were prepared by dry tumbling varying percentages of an MABS copolymer (CYCOLAC® GTM 5300), a urethane copolymer according to the Preparation Example above, with either a urethane compatibilizer (ESTANE® 58213, which is commercially available from the B. F. Goodrich Company of Cleveland, Ohio), a urethane-ABS compatibilizer (PREVAIL® 3100, which is commercially available from Dow Chemical Company of Midland, Mich.), or a transparent ABS compatibilizer, namely, a styrene-acrylonitrile (SAN) polymer (LUSTRAN® 31, which is commercially available from Monsanto Company of St. Louis, Mo.), or an ABS-B or ABS-SBR rubbery copolymer, as described above. The weight percentage of each component of each MABS composition is set forth in Table I.

The compositions were extruded in a twin screw Haake extruder, Model Rheomex TW-100, at 400° F. and 75–100 RPM. Each extrudate was cooled in a water bath at room temperature and pelletized. A sample of each composition was injection molded using a 150 ton Van Dorn injection molding machine which is commercially available from Van Dorn Plastic Machinery Corporation of Strongsville, Ohio. Each sample was dried at 175° F. for two hours and injection molded and tested according to ASTM and NFPA test procedures discussed below.

A ⅛" thick sample of each composition was tested for percent light transmission at a wavelength of 500 nanometers according to ASTM D1003 using a UV/VIS Spectrometer (Model Lambda 3B), which is commercially available from Perkin Elmer Corporation of Norwalk, Conn.

Samples of each composition were also tested for tensile strength (psi) and percent elongation according to ASTM D638 and for flexural strength and modulus (each in psi) according to ASTM D790. Notched Izod measurements were conducted according to ASTM D256.

Surface resistivity testing provides an indication of a material's ability to dissipate static charges. Statically dissipative materials have a surface resistivity in the range of $10^9$ to $10^{14}$ ohm/sq. Materials having surface resistivity values greater than $10^{14}$ are considered insulative.

Surface resistivity testing was conducted on 6"×3"×⅛" samples of each composition according to ASTM D257 using a 10V current. The gap distance between the electrodes was 0.38". The length of each electrode was 4.0". The surface resistivity was measured using a Hewlett-Packard High Resistance Meter Model 4329A, which is commercially available from Hewlett-Packard of Palo Alto, Calif. The results of the surface resistivity testing are given in units of ohms/square.

TABLE I

| SAMPLE NO. | WEIGHT PERCENTAGE OF COMPONENT | | | | | | |
| --- | --- | --- | --- | --- | --- | --- | --- |
| | MABS | POLYURE-THANE | ESTANE ® 58213 | LUSTRAN ® 31 | PREVAIL ® 3100 | ABS-B | ABS-SBR |
| 1 | 100.00 | — | — | — | — | — | — |
| 2 | 80.00 | 20.00 | — | — | — | — | — |
| 3 | 75.00 | 20.00 | 5.00 | — | — | — | — |
| 4 | 70.00 | 20.00 | — | 10.00 | — | — | — |
| 5 | 75.00 | 20.00 | — | — | 5.00 | — | — |
| 6 | 70.00 | 20.00 | — | — | — | 10.00 | — |
| 7 | 70.00 | 20.00 | — | — | — | — | 10.00 |

TABLE II

| SAMPLE NO. | PERCENTAGE OF LIGHT TRANSMISSION | TENSILE STRENGTH (p.s.i.) | PERCENT ELONGATION | FLEXURAL STRENGTH (p.s.i.) | FLEXURAL MODULUS (p.s.i.) | NOTCHED IZOD (ft-lb/in.) | SURFACE RESISTIVITY (ohms/square) |
| --- | --- | --- | --- | --- | --- | --- | --- |
| 1 | 51.40 | 6,900 | 20 | 10,500 | $3.5 \times 10^5$ | 2.00 | $>10^{14}$ |
| 2 | 28.10 | 4,160 | 33 | 6,000 | $2.2 \times 10^5$ | 2.18 | $7.7 \times 10^{12}$ |
| 3 | 32.10 | 4,000 | 72 | 5,300 | $2.0 \times 10^5$ | 8.7 | $1.2 \times 10^{13}$ |
| 4 | 25.50 | 5,000 | 39 | 6,800 | $2.6 \times 10^5$ | 2.13 | $4.0 \times 10^{12}$ |
| 5 | 24.50 | 4,350 | 54 | 5,900 | $2.2 \times 10^5$ | 8.0 | $7.9 \times 10^{12}$ |
| 6 | 46.60 | 4,000 | 59 | 5,400 | $2.0 \times 10^5$ | 5.9 | $3.9 \times 10^{12}$ |
| 7 | 43.90 | 4,400 | 52 | 5,900 | $2.2 \times 10^5$ | 6.7 | $8.1 \times 10^{12}$ |

The results of the above tests for each sample are set forth in Table II.

Sample No. 1 is a control sample of the MABS copolymer alone. Although the control sample had good light transmission, the sample was insulative and would not dissipate an electrical charge. When 20% of the MABS copolymer was replaced with the urethane copolymer, Sample No. 2 exhibited a surface resistivity in the electrical dissipative range but the light transmission and impact strengths were poor.

In Sample No. 3 an additional 5 wt% of the MABS copolymer was replaced by a known urethane compatibilizer, ESTANE® 58213. The data indicate that the impact properties and percent elongation were improved over Sample No. 2, but the percent light transmission was still poor.

Similarly, in Sample No. 4, 10 wt% of a known ABS compatibilizer, the SAN copolymer LUSTRAN® 31, was added to the blend of the MABS and the urethane copolymer. Although the tensile strength and flexural properties were improved and the electrodissipative properties were maintained, the percent light transmission was still poor.

In Sample No. 5, 5 wt% of the MABS copolymer was replaced with a known ABS-polyurethane compatibilizer (PREVAIL® 3100) and 20 wt% with the urethane copolymer. A remarkable increase in percent elongation and impact strength was observed, which provided evidence that the additive improved the compatibility of the MABS copolymer and urethane copolymer. However, the light transmittance was still poor.

It is obvious to one of ordinary skill in the art that the addition of the known compatibilizers of Samples No. 3 – No. 5 were ineffective in improving the percent light transmission. Even the small difference in the refractive indices of the MABS copolymer and the urethane copolymer induced opacity which was not alleviated by these known compatibilizers even though the mechanical properties were improved.

In sample No. 6, 10 wt% of the MABS copolymer was replaced by an ABS rubbery copolymer (ABS-B) according to the present invention and 20 wt% was replaced by the urethane copolymer component. As shown in Table II, the compatibility was improved and the percent light transmittance and mechanical properties were very good. The desired reduction of surface resistivity was also achieved.

In Sample No. 7, 10 wt% of the MABS copolymer was replaced by another ABS rubbery copolymer (ABS-SBR) and 20 wt% was replaced by the polyurethane component, according to the present invention. As shown in Table II, not only was the compatibility improved, but the percent light transmittance was increased dramatically to 46.6%, almost equivalent to that of the MABS copolymer (Sample No. 1) alone. The desired reduction of surface resistivity was also achieved.

EXAMPLE II

MABS copolymer compositions were prepared by dry tumbling varying percentages of an MABS copolymer (CYCOLAC® GTM 5300), the urethane copolymer of the above Preparation Example, together with either a known MBS impact modifier (KANE ACE® B22, which is commercially available from Kaneka Texas Corporation or PARALOID BTA-III or PARALOID BTA-733, each of which is commercially available from Rohm and Haas Company of Philadelphia, Pa.) or an ABS-B or ABS-SBR rubber copolymer, as described above. The weight percentage of each component of each MABS composition is set forth in Table III.

The compositions were extruded and injection molded in a similar manner to that in Example I. Also, static decay tests according to National Fire Protection Association (NFPA)

code 56A were conducted on Samples Nos. 11 and 12. The NFPA code requires that the applied charge drop to 10% of its initial value within 0.5 seconds at 50% relative humidity. The initial charge is applied at 5,000 volts.

In Sample No. 8, 10 wt% of a known methacrylate-butadiene-styrene (MBS) impact modifier (KANE ACE® B22) having a refractive index of 1.535 was blended with 70 wt% of the MABS copolymer of Example I and 20 wt% of the urethane copolymer component. Kane Ace® B22 is well known in the art to provide excellent clarity and impact strength for transparent blow molded polyvinyl chloride bottles. As shown in Table IV, Sample No. 8 exhibited poor light transmission, percent elongation and impact strength.

In Sample No. 9, 10 wt% of a known MBS rubbery impact modifier (PARALOID BTA-III), having a refractive index of 1.539, identical to that of the ABS-SBR of Sample No. 12, was added to a blend of the urethane copolymer and the rigid thermoplastic MABS of Example I. PARALOID BTA-III is well known in the industry for good clarity and toughness when compounded into polyvinyl chloride. As shown in Table IV, Sample No. 9 exhibited poor light transmission, percent elongation and impact strength, even though this rubbery impact modifier has similar monomer components as the clear MABS of Sample No. 1.

In Sample No. 10, 10 wt% of a known MBS impact modifier (PARALOID® BTA-733) having a refractive index of 1.537, identical to that of the MABS copolymer, was compounded into a blend as in the previous two examples. Although a slight improvement in impact strength was observed, percentage of light transmission was still poor and the impact properties were worse. To one skilled in the art, this finding is totally unexpected; and one can only come to the conclusion that there is something unique and novel about ABS rubbery impact modifiers in compatibilizing the MABS and urethane copolymers of Example I to achieve a high degree of transparency.

To test the utility and reproducibility of this invention larger quantity samples, shown as Sample Nos. 11 and 12, were compounded utilizing the ABS rubber modifiers of Examples 6 and 7. The materials were preblended and fed directly into a 40 mm twin screw Werner and Pfleiderer extruder available from Werner & Pfleiderer Corporation in Ramsey, N.J.

The materials were extruded at 400° F. and 200 RPM. These conditions were determined as optimum conditions for the compounding process. The extrudate was quenched by water and pelletized into pellets that were used to injection mold testing specimens. Excellent mechanical properties and percentage of light transmission were achieved as shown in Table IV.

The mechanical and impact properties of Sample Nos. 11 and 12 are very similar to the properties of Sample Nos. 6 and 7. This similarity shows the practicality and the consistency of these compositions. To further establish the utility of these compositions, the static decay properties were measured according to the NFPA test method 56-A. Both Sample Nos. 11 and 12 passed.

The rate of static decay is one of the most important qualities of antistatic materials. It shows the surface conductivity of Sample Nos. 11 and 12 has the practical ability to dissipate electrical charge rapidly.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A transparent thermoplastic composition with electro-dissipative properties having a surface resistivity of about $10^9$ to about $10^{14}$ ohm/square, comprising a blend of:

a.) a transparent moldable methacrylate-acylonitrile-butadiene-styene (MABS) thermoplastic copolymer having a refractive index of about 1.53 to 1.55;

b.) a transparent inherently antistatic thermoplastic urethane copolymer having a refractive index of about 1.53 to 1.55 which is the reaction product of a hydroxy-terminated polyalkylene ether oligomer, a $C_2$ to $C_6$ alkanediol, and an aromatic diisocyanate; and c.) an acrylonitrile-butadiene-styrene rubbery copolymer produced by way of emulsion polymerization contain-

TABLE III

| COMPONENT | REFRACTIVE INDEX | WEIGHT PERCENTAGE OF COMPONENT IN SAMPLE | | | | |
|---|---|---|---|---|---|---|
| | | 8 | 9 | 10 | 11 | 12 |
| MABS | 1.537 | 70.00 | 70.00 | 70.00 | 70.00 | 70.00 |
| URETHANE COPOLYMER | 1.543 | 20.00 | 20.00 | 20.00 | 20.00 | 20.00 |
| KANE ACE ® B22 | 1.535 | 10.00 | — | — | — | — |
| PARALOID BTA-III | 1.539 | — | 10.00 | — | — | — |
| PARALOID BTA-733 | 1.537 | — | — | 10.00 | — | — |
| ABS-B | 1.545 | — | — | — | 10.00 | — |
| ABS-SBR | 1.539 | — | — | — | — | 10.00 |

TABLE IV

| SAMPLE NO. | PERCENTAGE OF LIGHT TRANSMISSION | TENSILE STRENGTH (p.s.i.) | PERCENT ELONGATION | NOTCHED IZOD (ft-lb/in) | SURFACE RESISTIVITY (ohms/square) | STATIC DECAY |
|---|---|---|---|---|---|---|
| 8 | 25.10 | 2,495 | 6 | 1.1 | $5.6 \times 10^{11}$ | — |
| 9 | 17.20 | 2,500 | 6 | 0.8 | $6.9 \times 10^{11}$ | — |
| 10 | 23.50 | 2,800 | 8 | 2.4 | $4.6 \times 10^{12}$ | — |
| 11 | 45.30 | 4,000 | 31 | 5.1 | $2.3 \times 10^{12}$ | PASSED |
| 12 | 53.70 | 3,800 | 64 | 6.9 | $5.0 \times 10^{12}$ | PASSED | ing at least 40 weight percent of butadiene monomer in which the ratio of styrene to acrylonitrile monomer is such that the refractive index is between 1.53 to 1.55; wherein the blend comprises about 40 to 90 weight percent MABS copolymer, about 10 to 40 weight percent urethane copolymer and about 1 to 25 weight percent rubbery copolymer.

2. A composition according to claim 1 wherein the acrylonitrile-butadiene-styrene rubbery copolymer is selected from the group consisting of:

a.) an ABS-B copolymer where styrene and acrylonitrile monomers are copolymerized with a butadiene monomer content of about 40–50 weight percent; and b.) an ABS-SBR copolymer where styrene and acrylonitrile monomers are copolymerized onto a first stage copolymer of styrene-butadiene rubber latex containing up to about 2 weight percent divinylbenzene and up to about 10 weight percent acrylonitrile such that the first stage copolymer is present at a weight percentage between 60 and 70% of the total rubbery copolymer.

3. A composition according to claim 2 wherein the ABS-B copolymer has a styrene-acrylonitrile ratio of about 2.5/1 to 3/1, a refractive index of about 1.54, and a particle size of about 0.07 microns, as measured by transmission electron micrograph.

4. A composition according to claim 2 wherein in the ABS-SBR copolymer the weight ratio of styrene to acrylonitrile monomer added in the second stage is about 3.5/1 to about 4.5/1 and the overall refractive index of the ABS-SBR copolymer is about 1.54.

5. A composition according to claim 1 wherein the rubbery copolymer comprises an emulsion polymerization of a rubbery first stage containing about 40 to 50 weight percent butadiene and a second stage comprising a styrene-acrylonitrile copolymer.

6. A composition according to claim 1 wherein the refractive index of the urethane copolymer is about 1.54 to about 1.55.

7. A composition according to claim 1 wherein the urethane copolymer is the reaction product of about 0.2 to 0.3 moles of polyethyleneglycol and, 0.7 to 0.8 moles butanediol to 1 mole of methylenebisphenyldiisocyanate, said reaction product having a molecular weight of about 100,000 to 180,000.

8. A method for imparting electrostatic dissipative properties to a transparent, moldable methacrylate-acrylonitrile-butadiene-styrene (MABS) thermoplastic copolymer while maintaining or enhancing the physical properties of the MABS, comprising blending the MABS copolymer with a transparent, inherently antistatic thermoplastic urethane copolymer which is the reaction product of a hydroxy-terminated polyalkylene ether oligomer, $C_2$–$C_6$ alkanediol, and an aromatic diisocyanate, and compatibilizing the blend of MABS and urethane copolymers by adding an acrylonitrile-butadiene-styrene rubbery copolymer produced by emulsion polymerization containing at least 40 weight percent of butadiene monomer and a second stage of styrene-acrylonitrile copolymer, the blend comprising about 40 to 90 weight percent MABS co-polymer, about 10 to 40 weight percent urethane copolymer and about 1 to 25 weight percent rubbery copolymer and the refractive indices of all three copolymers in the blend being about 1.53 to 1.55.

* * * * *